(No Model.)

J. BIRCH.
COUPLING FOR SHAFTS, &c.

No. 281,436. Patented July 17, 1883.

Witnesses
W. C. Gates
W. Brown

Inventor
John Birch
by Warwick & Bartlett
His attorneys

UNITED STATES PATENT OFFICE.

JOHN BIRCH, OF DAYTON, OHIO, ASSIGNOR OF ONE-HALF TO J. R. JOHNSTON & SON, OF SAME PLACE.

COUPLING FOR SHAFTS, &c.

SPECIFICATION forming part of Letters Patent No. 281,436, dated July 17, 1883.

Application filed May 31, 1883. (No model.)

*To all whom it may concern:*

Be it known that I, JOHN BIRCH, a citizen of the United States, residing at Dayton, in the county of Montgomery and State of Ohio, have invented certain new and useful Improvements in Couplings for Shafts, &c., of which the following is a specification, reference being had therein to the accompanying drawings.

This invention relates to improvements in couplings for line-shafting, &c.; and its object is to make a shaft-coupling which shall be simple in construction and easy of application, and which shall have no projecting screw-heads or keys, which are objectionable as being liable to catch a garment, and thus become a source of danger.

The invention consists in a coupling-piece, preferably cylindrical, having a concentric bore, and having enlarged eccentric chambers to contain a wedge, crescent-shaped in cross-section, which serves to lock the shaft.

The same device may be used for securing a pulley to its shaft.

The particular features of the device which form my invention will be hereinafter pointed out in the claims.

Figure 1:
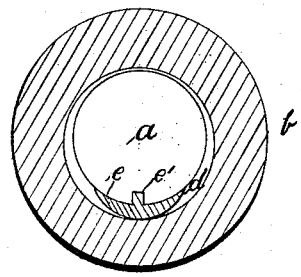
Figure 2:
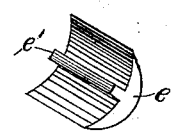
Figure 3:
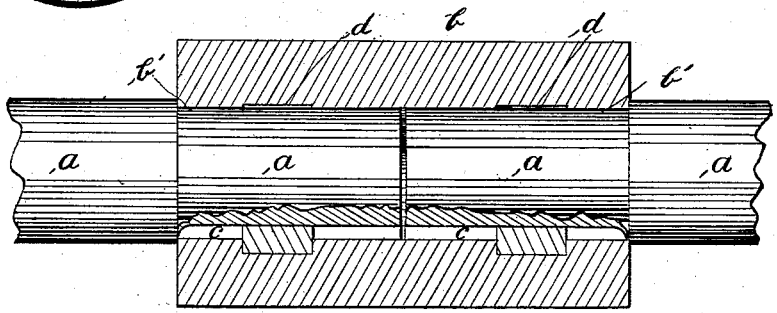
Figure 4:
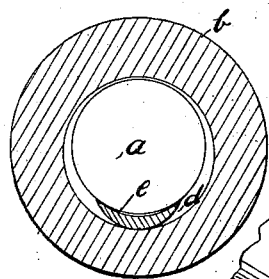
Figure 5:
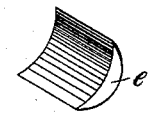
Figure 6:
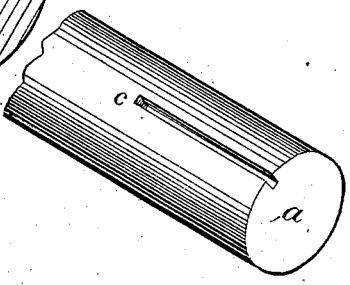

In the drawings, Figure 1 is a cross-section of my device through the coupling, wedge, and shaft. Fig. 2 is a perspective view of the crescent-shaped wedge provided with a gib. Fig. 3 is a longitudinal section of the coupling and wedge, the shaft being shown in elevation, partly broken away. Fig. 4 is a view similar to Fig. 1, showing a modified form of wedge. Fig. 5 shows said wedge detached. Fig. 6 is a perspective view of the shaft and key-seat.

$a$ denotes the shaft.

$b$ is a coupling, or it may be the hub of a pulley, having the usual concentric bore, $b'$, extending through it. This bore $b'$ is of the size of the shafts to be coupled.

An enlarged recess or chamber is made at $d$ eccentric to the bore $b'$. This chamber is of such length as to receive the crescent-shaped wedge $e$. The concave surface of this wedge is a little smaller than the shaft—that is, the curve would fit a shaft slightly smaller than the one with which it is intended to be used. The convex surface is of about the relative form shown. When found desirable, this wedge may have a gib, $e'$, which extends into a key-seat in the shaft. The wedge is placed in the deepest portion of the eccentric chamber $d$ and the shaft $a$ inserted. If the wedge with gib $e'$ is used, this gib enters the key-seat $c$ in the shaft. The coupling or pulley is then turned in a direction opposite to that in which it is to rotate, which immediately tightens the wedge in the eccentric chamber $d$, so that the shaft and coupling are firmly secured together. No matter which way the pulley or coupling is turned, the wedge will act to hold it from rotation on the shaft as soon as the wedge is brought to a bearing between the walls of the eccentric chamber and the shaft. The wedge with gib $e'$ is readily applied to shafts in which the key-seats are already cut, and forms a doubly-secure device for coupling the shaft and pulley when used in the eccentric chamber.

To uncouple the shaft the coupling or pulley is slightly moved in the direction opposite to that by which they were wedged together.

What I claim is—

1. A pulley or shaft coupling provided with a circular chamber eccentric to and of greater diameter than the perforation through which the shaft passes, in combination with a shaft and a crescent-shaped wedge arranged in said eccentric chamber so as to lock the pulley or coupling to the shaft when turned in either direction, substantially as described.

2. The pulley or coupling provided with circular chamber eccentric to the main chamber, the crescent-shaped wedge located in said chamber and arranged to lock, when turned in either direction, a gib on said wedge running in the direction of the length of the shaft, and the shaft having longitudinal key-seat to engage said gib, all substantially as shown and set forth.

In testimony whereof I affix my signature in presence of two witnesses.

JOHN BIRCH.

Witnesses:
ALPHONSO ROSEBOOM,
JOHN ROBBINS.